United States Patent
Kwon et al.

(10) Patent No.: US 12,058,353 B2
(45) Date of Patent: Aug. 6, 2024

(54) SIGNALING DECODED PICTURE BUFFER SIZE IN MULTI-LOOP SCALABLE VIDEO CODING

(71) Applicant: Texas Instruments Incorporated, Dallas, TX (US)

(72) Inventors: Do-Kyoung Kwon, Allen, TX (US); Madhukar Budagavi, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 18/123,772

(22) Filed: Mar. 20, 2023

(65) Prior Publication Data

US 2023/0232025 A1 Jul. 20, 2023

Related U.S. Application Data

(63) Continuation of application No. 17/380,498, filed on Jul. 20, 2021, now Pat. No. 11,611,767, which is a
(Continued)

(51) Int. Cl.
| | |
|---|---|
| H04N 19/31 | (2014.01) |
| H04N 19/423 | (2014.01) |
| H04N 19/46 | (2014.01) |
| H04N 19/573 | (2014.01) |
| H04N 19/577 | (2014.01) |
| H04N 19/105 | (2014.01) |

(Continued)

(52) U.S. Cl.
CPC ........... *H04N 19/31* (2014.11); *H04N 19/423* (2014.11); *H04N 19/46* (2014.11); *H04N 19/573* (2014.11); *H04N 19/577* (2014.11); *H04N 19/105* (2014.11); *H04N 19/156* (2014.11); *H04N 19/172* (2014.11); *H04N 19/187* (2014.11); *H04N 19/33* (2014.11); *H04N 19/44* (2014.11)

(58) Field of Classification Search
CPC ...... H04N 19/31; H04N 19/423; H04N 19/46; H04N 19/573; H04N 19/577; H04N 19/105; H04N 19/156; H04N 19/172; H04N 19/187; H04N 19/33; H04N 19/44
USPC .................................................... 375/240.26
See application file for complete search history.

(56) References Cited

U.S. PATENT DOCUMENTS

| | | |
|---|---|---|
| 2007/0183494 A1 | 8/2007 | Hannuksela |
| 2008/0089411 A1* | 4/2008 | Wenger ................ H04N 19/105 |
| | | 375/E7.243 |

(Continued)

OTHER PUBLICATIONS

Gary J. Sullivan et al. "Overview of the High Efficiency Video Coding (HEVC) Standard," IEEE Transactions on Circuits and Systems for Video Technology, vol. 22, No. 12, Dec. 2012, pp. 1649-1668.

(Continued)

*Primary Examiner* — Marnie A Matt
(74) *Attorney, Agent, or Firm* — Carl G. Peterson; Frank D. Cimino

(57) ABSTRACT

A method includes decoding, by a decoder, an indication of a decoded picture buffer (DPB) size from a bitstream. In addition, the method includes decoding, by the decoder, a first enhancement layer of the bitstream and a reference layer of the bitstream based on the indication of the DPB size to generate decoded data. The method also includes outputting, by the decoder, the decoded data.

20 Claims, 8 Drawing Sheets

Related U.S. Application Data continuation of application No. 16/701,700, filed on Dec. 3, 2019, now Pat. No. 11,102,497, which is a continuation of application No. 15/948,891, filed on Apr. 9, 2018, now Pat. No. 10,531,108, which is a continuation of application No. 14/138,002, filed on Dec. 20, 2013, now Pat. No. 9,942,545.

(60) Provisional application No. 61/811,373, filed on Apr. 12, 2013, provisional application No. 61/753,172, filed on Jan. 16, 2013, provisional application No. 61/748,581, filed on Jan. 3, 2013.

(51) Int. Cl.
| | |
|---|---|
| H04N 19/156 | (2014.01) |
| H04N 19/172 | (2014.01) |
| H04N 19/187 | (2014.01) |
| H04N 19/33 | (2014.01) |
| H04N 19/44 | (2014.01) |

(56) References Cited

U.S. PATENT DOCUMENTS

| | | | |
|---|---|---|---|
| 2008/0117985 | A1 | 5/2008 | Chen et al. |
| 2009/0003445 | A1 | 1/2009 | Ying et al. |
| 2010/0020871 | A1 | 1/2010 | Hannuksela et al. |
| 2010/0128786 | A1 | 5/2010 | Gao et al. |
| 2010/0238822 | A1 | 9/2010 | Koyabu et al. |
| 2011/0002397 | A1 | 1/2011 | Wang et al. |
| 2011/0064146 | A1 | 3/2011 | Chen et al. |
| 2012/0057631 | A1 | 3/2012 | Le Leannec |
| 2012/0183065 | A1 | 7/2012 | Rusert |
| 2012/0269275 | A1 | 10/2012 | Hannuksela |
| 2013/0156101 | A1* | 6/2013 | Lu .......................... H04N 19/44 375/E7.246 |
| 2013/0208792 | A1 | 8/2013 | He et al. |
| 2014/0092978 | A1 | 4/2014 | Bugdayci et al. |
| 2014/0161181 | A1* | 6/2014 | Samuelsson ......... H04N 19/503 375/240.12 |
| 2014/0177721 | A1 | 6/2014 | Onno |
| 2014/0301459 | A1* | 10/2014 | Boyce .................. H04N 19/503 375/240.12 |
| 2015/0016545 | A1 | 1/2015 | Ramasubramanian |
| 2016/0227249 | A1 | 8/2016 | Choi |
| 2016/0323592 | A1 | 11/2016 | Choi |

OTHER PUBLICATIONS

"Overview of Temporal Scalability with Scalable Video Coding (SVC)", SPRABG3, Texas Instruments Incorporated, Nov. 2010, pp. 1-8.

Do-Kyoung Kwon et al, "Hierarchical Inter-Layer Prediction in Multi-Loop Scalable Extension of HEVC", JCTVC-K0264, Joint Collaborative Team on Video Coding (JCT-VC) of ITU-T SG 16 WP3 and ISO/IEC JTC 1/SC 29/WG11, Oct. 10-19, 2012, Shanghai, China, pp. 1-7.

J. Chen et al, "A Proposal for Scalable HEVC Test Model", JCTVC-K0348, Joint Collaborative Team on Video Coding (JCT-VC) of ITU-T SG 16 WP3 and ISO/IEC JTC 1/SC 29/WG11, Oct. 10-19, 2012, Shanghai, China, pp. 1-6.

Frank Bossen, "Common Test Conditions and Software Reference Configurations", JCTVC-K1100, Joint Collaborative Team on Video Coding (JCT-VC) of ITU-T SG 16 WP3 and ISO/IEC JTC 1/SC 29/WG11, Oct. 10-19, 2012, Shanghai, China, pp. 1-3.

Jianle Chen et al, "High Efficiency Video Coding (HEVC) Scalable Extension Draft 4", JCTVC-O1008_v1, Joint Collaborative Team on Video Coding (JCT-VC) of ITU-T SG 16 WP3 and ISO/IEC JTC 1/SC 29/WG11, Oct. 23-Nov. 1, 2013, Geneva, Switzerland, 76 pages.

ITU-T Recommendation H.265, Series H: Audiovisual and Multimedia Systems, Infrastructure of Audiovisual Services—Coding of Moving Video, ITU-T Telecommunication Standardization Sector of ITU, Apr. 2013, pp. 1-317.

Gary Sullivan and Jens-Rainer Ohm, "Joint Call for Proposals on Scalable Video Coding Extensions of High Efficiency Video Coding (HEVC)", VCEG-AS90, Jul. 14-20, 2012, ITU-Telecommuniactions Standardization Sector, Study Group 16, Question 6, Video Coding Experts Group (VCEG), Stockholm, Sweden, pp. 1-11.

Thomas Wiegand et al, "WD3: Working Draft 3 of High-Efficiency Video Coding", JCTVC-E603, Joint Collaborative Team on Video Coding (JCT-VC) of ITU-T SG 16 WP3 and ISO/IEC JTC 1/SC 29/WG11, Mar. 16-23, 2011, Geneva, Switzerland, pp. 1-215.

Benjamin Bross et al, "High Efficiency Video Coding (HEVC) Text Specification Draft 8", JCTVC-J1003_d7, Joint Collaborative Team on Video Coding (JCT-VC) of ITU-T SG 16 WP3 and ISO/IEC JTC 1/SC 29/WG11, Jul. 11-20, 2012, Stockholm, Sweden, 260 pages.

TMS320DM6467 Digital Media System-on-Chip, SPRS403G, Texas Instruments Incorporated, Dec. 2007, revised Oct. 2010, pp. 1-355.

Benjamin Bross et al, "High Efficiency Video Coding (HEVC) Text Specification Draft 9", JCTVC-K1003_v13, Joint Collaborative Team on Video Coding (JCT-VC) of ITU-T SG 16 WP3 and ISO/IEC JTC 1/SC 29/WG11, Oct. 10-19, 2012, Shanghai, China (317 pages).

Miska Hannuksela et al, "Design Considered for Signalling Inter-layer Prediction Indication", JCTVC-L0449, Joint Collaborative Team on Video Coding (JCT-VC) of ITU-T SG 16 WP3 and ISO/IEC JTC 1/SC 29/WG11, Jan. 14-23, 2013, Geneva, Switzerland, (2 pages).

Hendry et al, "AHG 9: Inter-Layer Prediction Indication at Picture Level", JCTVC-M0129_r1, Joint Collaborative Team on Video Coding (JCT-VC) of ITU-T SG 16 WP3 and ISO/IEC JTC 1/SC 29/WG11, Apr. 18-26, 2013, Incheon, Korea (7 pages).

Hendry et al, "AHG 9: Inter-Layer Prediction Indication at Picture Level", JCTVC-M0129 Presentation, Joint Collaborative Team on Video Coding (JCT-VC) of ITU-T SG 16 WP3 and ISO/IEC JTC 1/SC 29/WG11, Apr. 18-26, 2013, Incheon, Korea (9 pages).

Hendry et al, "AHG 9: Signalling Inter-layer Prediction Indication", JCTVC-M0203, Joint Collaborative Team on Video Coding (JCT-VC) of ITU-T SG 16 WP3 and ISO/IEC JTC 1/SC 29/WG11, Apr. 18-26, 2013, Incheon, Korea (3 pages).

Benjamin Bross et al, "High Efficiency Video Coding (HEVC) Text Specification Draft 7", JCTVC-I1003_d9, Joint Collaborative Team on Video Coding (JCT-VC) of ITU-T SG 16 WP3 and ISO/IEC JTC 1/SC 29/WG11, Apr. 27-May 7, 2012, Geneva, Switzerland (280 pages).

Benjamin Bross et al, High Efficiency Video Coding (HEVC) Text Specification Draft 10 (for FDIS & Last Call), JCTVC-L1003_v34, Joint Collaborative Team on Video Coding (JCT-VC) of ITU-T SG 16 WP3 and ISO/IEC JTC 1/SC 29/WG11, Jan. 14-23, 2013, Geneva, Switzerland (310 pages).

Thomas Wiegand et al, "Overview of the H.264/AVC Video Coding Standard," IEEE Transactions on Circuits and Systems for Video Technology, vol. 13, No. 7, Jul. 2003, pp. 560-576.

Hahyun Lee et al, "Scalable Extension of HEVC for Flexible High-Quality Digital Video Content Services", ETRI Journal, vol. 34, No. 6, Dec. 2013, pp. 990-1000.

Do-Kyoung Kwon et al., "Multi-Loop Scalable Video CODEC Based on High Efficiency Video Coding (HEVC)", 2013 IEEE International Conference on Acoustics, Speech and Signal Processing (ICASSP), May 26-31, 2013, Vancouver, BC (5 pages).

Heiko Schwarz et al, "Overview of the Scalable Video Coding Extension of the H.264/AVC Standard", IEEE Transactions on Circuits and Systems for Video Technology, vol. 17, No. 9, Sep. 2007, pp. 1103-1120.

Il-Koo Kim et al, "HM7: High Efficiency Video Coding (HEVC) Test Model 7 Encoder Description", JCTVC-I1002, Joint Collaborative Team on Video Coding (JCT-VC) of ITU-T SG 16 WP3 and ISO/IEC JTC 1/SC 29/WG11, Apr. 27-May 7, 2012, Geneva, Switzerland (50 pages).

Do-Kyoung Kwon et al, "Description of Scalable Video Coding Technology Proposal by Texas Instruments Inc.", JCTVC-K0038,

(56) References Cited

OTHER PUBLICATIONS

Joint Collaborative Team on Video Coding (JCT-VC) of ITU-T SG 16 WP3 and ISO/IEC JTC 1/SC 29/WG11, Oct. 10-19, 2012, Shanghai, China (47 pages).

Benjamin Bross et al, "WD5: Working Draft 5 of High-Efficiency Video Coding", JCTVC-G1103_d9, Joint Collaborative Team on Video Coding (JCT-VC) of ITU-T SG 16 WP3 and ISO/IEC JTC 1/SC 29/WG11, Nov. 21-30, 2011, Geneva, Switzerland (237 pages).

Benjamin Bross et al, "WD4: Working Draft 4 of High-Efficiency Video Coding", JCTVC-F803_d6, Joint Collaborative Team on Video Coding (JCT-VC) of ITU-T SG 16 WP3 and ISO/IEC JTC 1/SC 29/WG11, Jul. 14-22, 2011, Torino, Italy (229 pages).

Benjamin Bross et al, "High Efficiency Video Coding (HEVC) Text Specification Draft 6", JCTVC-H1003, Joint Collaborative Team on Video Coding (JCT-VC) of ITU-T SG 16 WP3 and ISO/IEC JTC 1/SC 29/WG11, Nov. 21-30, 2011, Geneva, Switzerland (259 pages).

\* cited by examiner

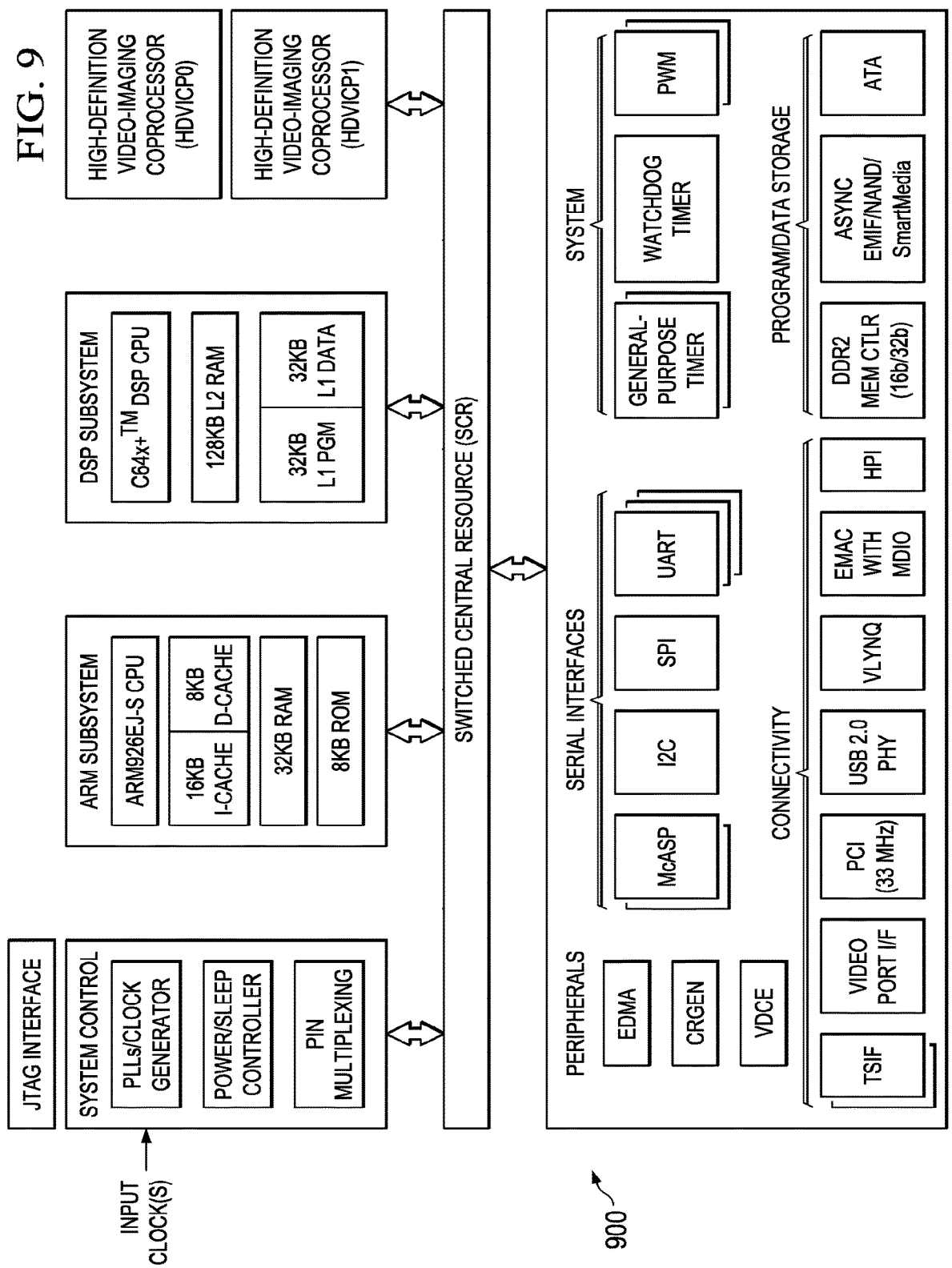

SIGNALING DECODED PICTURE BUFFER SIZE IN MULTI-LOOP SCALABLE VIDEO CODING

CROSS-REFERENCE TO RELATED APPLICATIONS

This application is a continuation of U.S. patent application Ser. No. 17/380,498, filed Jul. 20, 2021 (scheduled to grant U.S. Pat. No. 11,611,767), which is a continuation of U.S. patent application Ser. No. 16/701,700, filed Dec. 3, 2019 (now U.S. Pat. No. 11,102,497), which is a continuation of U.S. patent application Ser. No. 15/948,891, filed Apr. 9, 2018 (now U.S. Pat. No. 10,531,108), which is a continuation of U.S. patent application Ser. No. 14/138,002, filed Dec. 20, 2013 (now U.S. Pat. No. 9,942,545), which claims benefit of U.S. Provisional Patent Application Ser. No. 61/748,581, filed Jan. 3, 2013, U.S. Provisional Patent Application Ser. No. 61/753,172, filed Jan. 16, 2013, and U.S. Provisional Patent Application Ser. No. 61/811,373, filed Apr. 12, 2013, all of which are incorporated herein by reference in their entirety. This application is related to U.S. patent application Ser. No. 14/137,995, filed Dec. 20, 2013, which is incorporated by reference herein in its entirety.

BACKGROUND OF THE INVENTION

Field of the Invention

Embodiments of the present invention generally relate to video coding and more specifically relate to signaling decoded picture buffer size in multi-loop scalable video coding.

Description of the Related Art

The demand for digital video products continues to increase. Some examples of applications for digital video include video communication (e.g., video conferencing and multimedia messaging), security and surveillance, industrial automation, and entertainment (e.g., DV, HDTV, satellite TV, set-top boxes, Internet video streaming, video gaming devices, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video transmission systems using the internet and mobile networks have a wide range of receiving devices, i.e., video endpoints, ranging, for example, from cellular telephones with small screens to tablet computers to personal computers with high definition displays to video conferencing systems with large screens. That is, the devices receiving a video transmission may have different resolution, frame rate, and bandwidth capabilities. Scalable video coding (SVC) is one technique that may be used to allow a video to be received by a range of receiving devices according to the capabilities of each device. In general, SVC refers to encoding a video as a single scalable video bitstream with one or more subset bitstreams that are adapted to varying video endpoint capabilities, network conditions, and/or user preferences.

A video bitstream may be referred to as scalable when parts of the stream can be removed such that the resulting subset bitstream is a valid bitstream for some target decoder, and the subset bitstream represents the original video content with a reconstruction quality that is less than that of the complete original bitstream but is high in view of the lower quantity of data in the subset bitstream. Typically, three scalability modes are considered: temporal, spatial, and quality. A spatially scaled subset bitstream represents the original video content at a reduced picture size. A temporally scaled subset bitstream represents the original video content at a reduced frame rate. A quality scaled subset bitstream represents the original video content at the same spatial and temporal resolution as the complete bitstream but at a lower quality, i.e., signal-to-noise ratio (SNR).

In scalable video coding, a single encoded bitstream, which may be referred to as a scalable bitstream herein, may include multiple layers (sub-bitstreams) of compressed video data. The base layer is the most basic, scaled down compressed data needed to reconstruct the video stream at the lowest spatial resolution, temporal resolution, and/or quality. The remaining compressed video data in the scalable bitstream is grouped into one or more enhancement layers. Each enhancement layer "builds" on the layer or layers below and includes video data that a decoder can use (in conjunction with data from the lower layer or layers) to generate an enhanced version of the video stream. Thus, the architecture of a video encoder that generates a scalable video bitstream may include a base layer encoder and one or more enhancement layer encoders. Similarly, the architecture of a video decoder that decodes a scalable video bitstream may include a base layer decoder and one or more enhancement layer decoders.

H.264/SVC is an example of a video coding standard that provides scalable video coding. More specifically, H.264/SVC is a scalable video coding (SVC) extension of H.264/AVC that supports temporal, spatial and quality scalability functions. A summary of H.264/SVC is presented in H. Schwarz, et al., "Overview of The Scalable Video Coding Extension of the H.264/SVC Standard," IEEE Trans. Circuits and Systems, vol. 17, No. 9, September 2007. The temporal scalability of H.264/SVC allows decoding of a bitstream at different frame rates by partitioning a set of pictures into a temporal base layer bitstream and temporal enhancement layer bitstreams. The spatial scalability and quality scalability of H.264/SVC allow encoding of video at different resolutions and qualities as a base layer bitstream and one or more enhancement layer bitstreams.

In general, a scalable video codec may be based on either a multi-loop architecture or a single loop architecture. In a single loop architecture, which is used in H.264/SVC, a full decoding loop takes place only in the target layer. Inter-coded blocks in intermediate layers are not reconstructed and sophisticated inter-layer prediction techniques such as residual prediction and motion prediction are used. In a multi-loop architecture, a full encoding/decoding loop is performed in every layer needed to encode/decode a target layer, thus avoiding the need for the complex inter-layer prediction techniques. Both intra- and inter-coded blocks are fully reconstructed in all layers and the reconstructed samples from lower layers may be used as reference samples for higher layers. The scalable extension currently under development by Joint Collaborative Team on Video Coding (JCT-VC) of ITU-T WP3/16 and ISO/IEC JTC 1/SC 29/WG 11 for the recently completed first version of the High Efficiency Video Coding (HEVC) standard is based on a multi-loop architecture.

SUMMARY

Embodiments of the present invention relate to methods, apparatus, and computer readable media for signaling decoded picture buffer size in multi-loop scalable video coding. In one aspect, a method for encoding a video sequence in a scalable video encoder to generate a scalable bitstream is provided that includes encoding the video sequence in a first layer encoder of the scalable video encoder to generate a first sub-bitstream, encoding the video sequence in a second layer encoder of the scalable video encoder to generate a second sub-bitstream, wherein portions of the video sequence being encoded in the second layer encoder are predicted using reference portions of the video sequence encoded in the first layer encoder, combining the first sub-bitstream and the second sub-bitstream to generate the scalable bitstream, and signaling in the scalable bitstream an indication of a maximum decoded picture buffer (DPB) size needed for decoding the second sub-bitstream and the first sub-bitstream when the second sub-bitstream is a target sub-bitstream for decoding.

In one aspect, a method for decoding a scalable bitstream in a scalable video decoder to generate a video sequence is provided that includes decoding from the scalable bitstream an indication of a maximum decoded picture buffer (DPB) size needed to decode a first enhancement layer sub-bitstream of the scalable bitstream and a reference layer sub-bitstream for the first enhancement layer sub-bitstream when the first enhancement layer sub-bitstream is decoded as a target sub-bitstream, and using the indication of the maximum DPB size for further processing of the scalable bitstream.

In one aspect, an apparatus configured to decode a scalable bitstream is provided that includes means for decoding from the scalable bitstream an indication of a maximum decoded picture buffer (DPB) size needed to decode a first enhancement layer sub-bitstream of the scalable bitstream and a reference layer sub-bitstream for the first enhancement layer sub-bitstream when the first enhancement layer sub-bitstream is decoded as a target sub-bitstream, and means for using the indication of the maximum DPB size for further processing of the scalable bitstream.

BRIEF DESCRIPTION OF THE DRAWINGS

Particular embodiments will now be described, by way of example only, and with reference to the accompanying drawings:

FIG. 9 is a block diagram of an illustrative digital system.

DETAILED DESCRIPTION OF EMBODIMENTS OF THE INVENTION

Figure 1:
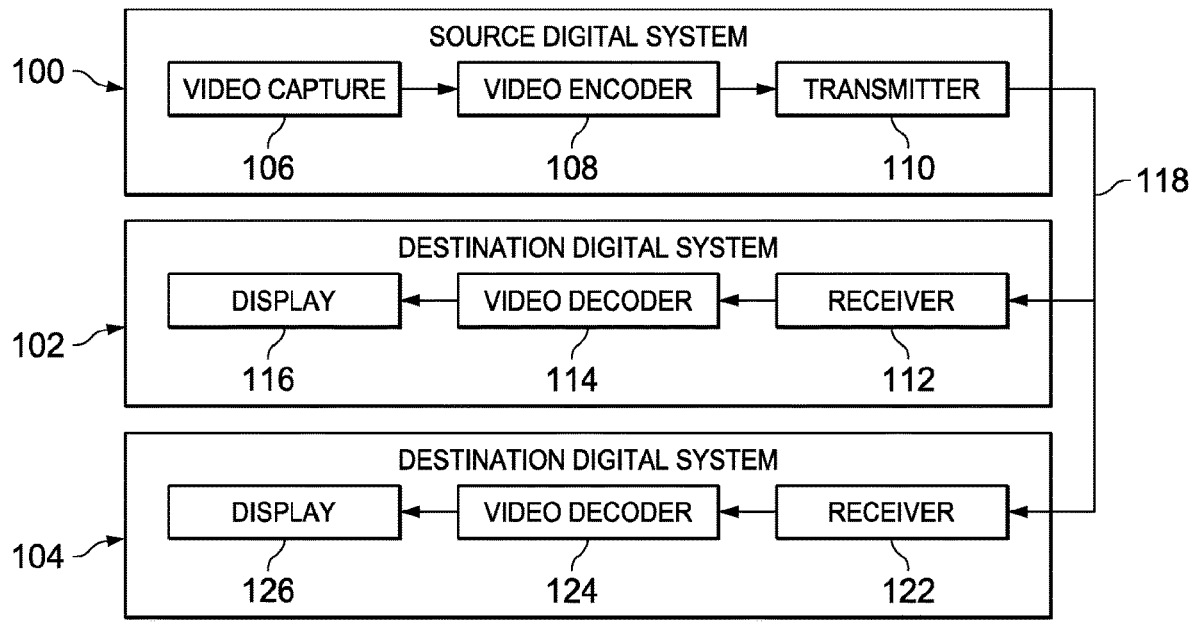
FIG. 1 is a block diagram of a video transmission system configured for scalable video coding.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC and the scalable coding extension, referred to herein as SHVC, currently being developed. One of ordinary skill in the art will understand that embodiments of the invention are not limited to HEVC and SHVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU) using recursive quadtree partitioning. A CU is a block of pixels within an LCU and the CUs within an LCU may be of different sizes. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC and SHVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, California, Feb. 1-10, 2012, ("HEVC Draft 6"), B. Bross, et al., "High Efficiency Video Coding (HEVC) Text Specification Draft 7," JCTVC-11003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013 ("HEVC Draft 10"), J. Chen, et al., "High Efficiency Video Coding (HEVC) Scalable Extension Draft 4," Joint Collaborative Team on Video Coding (JCT-VC) of ITU-T SG16 WP3 and ISO/IEC JTC1/SC29/WG1, Geneva, CH, Oct. 23-Nov. 1, 2013 ("SHVC Draft 4"), and "High Efficiency Video Coding," ITU-T Rec. H.265 ISO/IEC 23008-2, April 2013 ("HEVC/H.265").

As previously mentioned, the scalable extension of HEVC, SHVC, is currently being developed. A multi-loop architecture is proposed for this extension. Using a multi-loop architecture increases the decoded picture buffer (DPB) size and the memory bandwidth for motion compensation in a decoder as compared to a single loop architecture but the coding efficiency is better as the high correlation between an enhancement layer picture and a reconstructed reference layer picture can be exploited and any reference layers are not required to use constrained intra-prediction. A reference layer may be any layer below the layer being encoded/decoded. The layer being encoded/decoded may be referred to as the target layer.

The current HEVC specification, HEVC/H.265, provides for temporal scalability in which pictures may be encoded in a temporal hierarchy of two or more temporal levels. Note that HEVC/H.265 designates positions in the temporal hierarchy as layers rather than levels. The word "level" is used herein to avoid confusion with the use of the word "layer" to describe the hierarchy positions of a scalable encoder and decoder. A video bitstream is temporally scalable when pictures in the bitstream can be removed such that the resulting sub-bitstream forms another valid bitstream for some target decoder, and the sub-bitstream represents the source video sequence at a frame rate that is less than the frame rate of the original video sequence. The temporal scalability in HEVC/H.265 is achieved by partitioning pictures into a temporal base level, level 0, and one or more temporal enhancement layers in which inter-prediction of pictures at a given temporal level is restricted to reference pictures in the same temporal level or in a lower temporal level. For example, pictures at temporal level 2 may be inter-predicted using reference data from pictures in temporal levels 2, 1, or 0 but not from pictures in higher temporal levels, if any.

Embodiments of the invention provide for decreasing the memory bandwidth and/or maximum DPB size needed to decode a target layer of a scalable bitstream in a multi-loop architecture. In some embodiments, a multi-loop scalable encoder signals an indication of the highest temporal level of reference data used for inter-layer prediction in the encoding of sub-bitstreams in enhancement layers. A multi-loop scalable decoder, when decoding an enhancement layer, may use the information regarding the highest temporal level to avoid decoding any pictures in a reference layer that are above the signaled level. In some embodiments, a multi-loop scalable encoder signals an indication of the maximum decoded picture buffer (DPB) size needed for decoding an enhancement layer sub-bitstream when that sub-bitstream is the target sub-bitstream for decoding. This indication allows a decoder to determine the maximum DPB size needed to decode the enhancement layer sub-bitstream and any reference sub-bitstreams needed for inter-layer prediction. In some such embodiments, a multi-loop scalable encoder signals for each sub-bitstream (except the sub-bitstream of the highest enhancement layer) an indication of the maximum decoded picture buffer (DPB) size needed for decoding the sub-bitstream if the sub-bitstream is not the target sub-bitstream, i.e., the non-target maximum DPB size. A multi-loop scalable decoder with limited DPB space may use the information regarding maximum DBP size, for example, to determine which of the sub-bitstreams, if any, it can decode. In some embodiments, a multi-loop scalable encoder signals both the highest temporal level of reference data and the maximum DPB size.

FIG. 1 shows a block diagram of a video transmission system configured for scalable video coding. The system includes a source digital system 100 that transmits encoded video sequences to multiple destination digital systems 102, 104 via a communication channel 118. While FIG. 1 shows two destination digital systems, the video transmission system may include any number of destination digital systems. The source digital system 100 includes a video capture component 106, a video encoder component 108, and a transmitter component 110. The video capture component 106 is configured to provide a video sequence to be encoded by the video encoder component 108. The video capture component 106 may be, for example, a video camera, a video archive, or a video feed from a video content provider. In some embodiments, the video capture component 104 may generate computer graphics as the video sequence, or a combination of live video, archived video, and/or computer-generated video.

The video encoder component 108 receives a video sequence from the video capture component 106 and encodes it as a scalable video bit stream for transmission by the transmitter component 110. In general, the video encoder component 108 receives the video sequence from the video capture component 106 as a sequence of pictures, divides the pictures into largest coding units (LCUs), and encodes the video data in the LCUs as a base layer bitstream and one or more enhancement layer bitstreams providing spatial, temporal, and/or quality scalability over the base layer bit stream. The base layer bitstream and the one or more enhancement layer bitstreams are combined to form a single scalable video bit stream for transmission. For spatial scalability, the base layer bitstream may be encoded at a base spatial resolution and the one or more enhancement layer bitstreams may be encoded at higher levels of spatial resolution. An embodiment of the video encoder component 108 is described in more detail below in reference to FIG. 2.

The transmitter component 110 transmits the scalable video bitstream to the destination digital systems 102,104 via the communication channel 118. The communication channel 118 may be any communication medium, or combination of communication media suitable for transmission of the encoded video sequence, such as, for example, wired or wireless communication media, a local area network, or a wide area network.

The destination digital systems 102, 104 may be any digital system configured to receive and decode scalable video bitstreams. For example, a destination digital system may be a cellular telephone, a video gaming device, a desktop computer, a laptop computer, a tablet computing device, a digital television, etc. The destination digital systems 102, 104 each include a receiver component 112, 122, a video decoder component 114, 124, and a display component 116, 126. The receiver components 112, 122 receive the scalable video bitstream from the source digital system 100 via the communication channel 118 and provide the encoded video data to the respective video decoder components 114, 124 for decoding.

In general, the video decoder components 114, 122 decode a target layer of the scalable video bitstream to reconstruct the video sequence at a desired level of temporal resolution, spatial resolution, and/or quality. However, the video decoder components 114, 122 may have different decoding capabilities depending on, for example, the resolution of the respective display component 116, 126 and the computational and memory resources of the respective destination digital system 102, 104. For example, if destination digital system 102 has limited memory and computational resources, the video decoder component 114 may be configured to decode only the base layer bitstream. If destination digital system 104 has a display with a higher resolution than that of the base layer bitstream and sufficient resources, the video decoder component 124 may be configured to decode an enhancement layer bitstream appropriate for the higher resolution. An embodiment of the video decoder components 114, 124 is described in more detail below in reference to FIG. 2.

The respective reconstructed video sequences are displayed on the respective display components 116, 126. The display components 116, 126 may be any suitable display devices such as, for example, a plasma display, a liquid crystal display (LCD), a light emitting diode (LED) display, etc.

In some embodiments, the source digital system 100 may also include a receiver component and a video decoder component and/or the destination digital systems 102, 104 may include a transmitter component and a video encoder component for transmission of video sequences in both directions for video streaming, video broadcasting, and video telephony. The video encoder component 108 and the video decoder components 114, 124 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
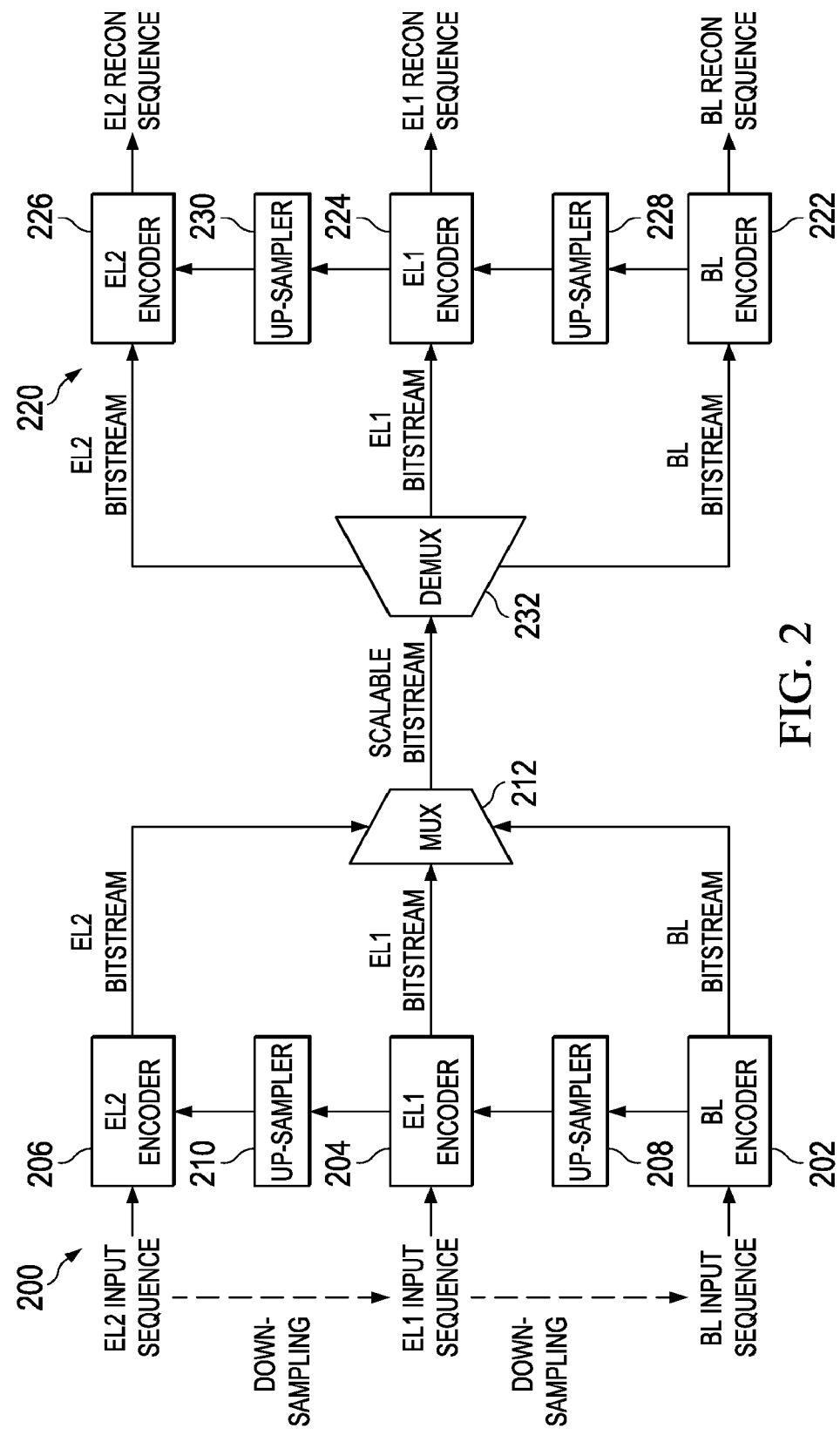
FIG. 2 is a block diagram of an example scalable video encoder and an example scalable video decoder.

FIG. 2 shows a high level block diagram of a three spatial layer configuration of a scalable video encoder 200 and a scalable video decoder 220. The general functionality of a scalable video encoder and decoder is well known and thus is not described in detail herein. For illustration, FIG. 2 shows an encoder structure 200 with three spatial layers, a base layer encoder 202 and two enhancement layer encoders 204, 206, and a decoder structure 220 with a base layer decoder 222 and two enhancement layer decoders 224, 226. One of ordinary skill in the art will understand embodiments in which the scalable video encoder 200 and the scalable video decoder 220 may include more or fewer enhancement layers.

A coarse-to-fine hierarchy of images is encoded. That is, the input high-resolution video sequence input into the highest enhancement layer encoder 206 is converted to lower resolutions for the intermediate enhancement layer encoder 204 and the base layer encoder 202 by filtering and decimation. Each layer of the scalable video encoder 200 is basically an HEVC video encoder extended to support inter-layer prediction. The base layer encoder 202 encodes the lowest resolution of the input video sequence as an HEVC compliant bitstream and the enhancement layer encoders 204, 206 encode higher resolutions of the input video sequence according to HEVC with the addition of any functionality needed for enhancement layer encoding, e.g., inter-layer prediction. The output bitstreams of the layer encoders are multiplexed 212 to form the scalable video bitstream. As is explained in more detail below, the scalable encoder 200 may add additional metadata to the scalable video bitstream corresponding to one or more of the output bitstreams.

In each encoder layer, motion-compensated prediction and intra-prediction as well as coding functions such as quantization, transformation, entropy coding, and deblocking are performed to generate the corresponding output sub-bitstreams. Inter-layer prediction is also provided in the enhancement layer encoders 204, 206 to improve the compression efficiency between layers. Inter-layer prediction exploits the redundancy between the layers by providing inter-layer sample prediction, residual prediction, and motion prediction between an enhancement layer and one or more reference layers. Inter-layer sample prediction uses co-located reconstructed samples from lower layers as reference samples for higher layers. Inter-layer residual prediction, which used mainly in a single-loop architecture, predicts residual signals in higher layers from lower-layer residual signals. In a multi-loop scalable encoder, inter-layer residual prediction may not be used since the majority of redundancy is removed by inter-layer sample prediction. Inter-layer motion prediction predicts motion vectors in higher layers from lower-layer motion vectors. At present, SHVC as described in SHVC Draft 4 provides for inter-layer sample prediction and inter-layer motion prediction.

The up-sampler 208 up-samples the reference data (reconstructed pictures) from the base layer encoder 202 to the resolution of the input video sequence of the enhancement layer encoder 204 for use in inter-layer prediction. Similarly, the up-sampler 210 up-samples the reference data (reconstructed pictures) from the intermediate enhancement layer encoder 204 to the resolution of the input video sequence of the top enhancement layer encoder 206 for use in inter-layer prediction. Although not explicitly shown for the sake of simplicity, the top enhancement layer encoder 206 may also use reference data from the base layer encoder 202 for inter-layer prediction and appropriate upsampling is provided.

Figure 3:
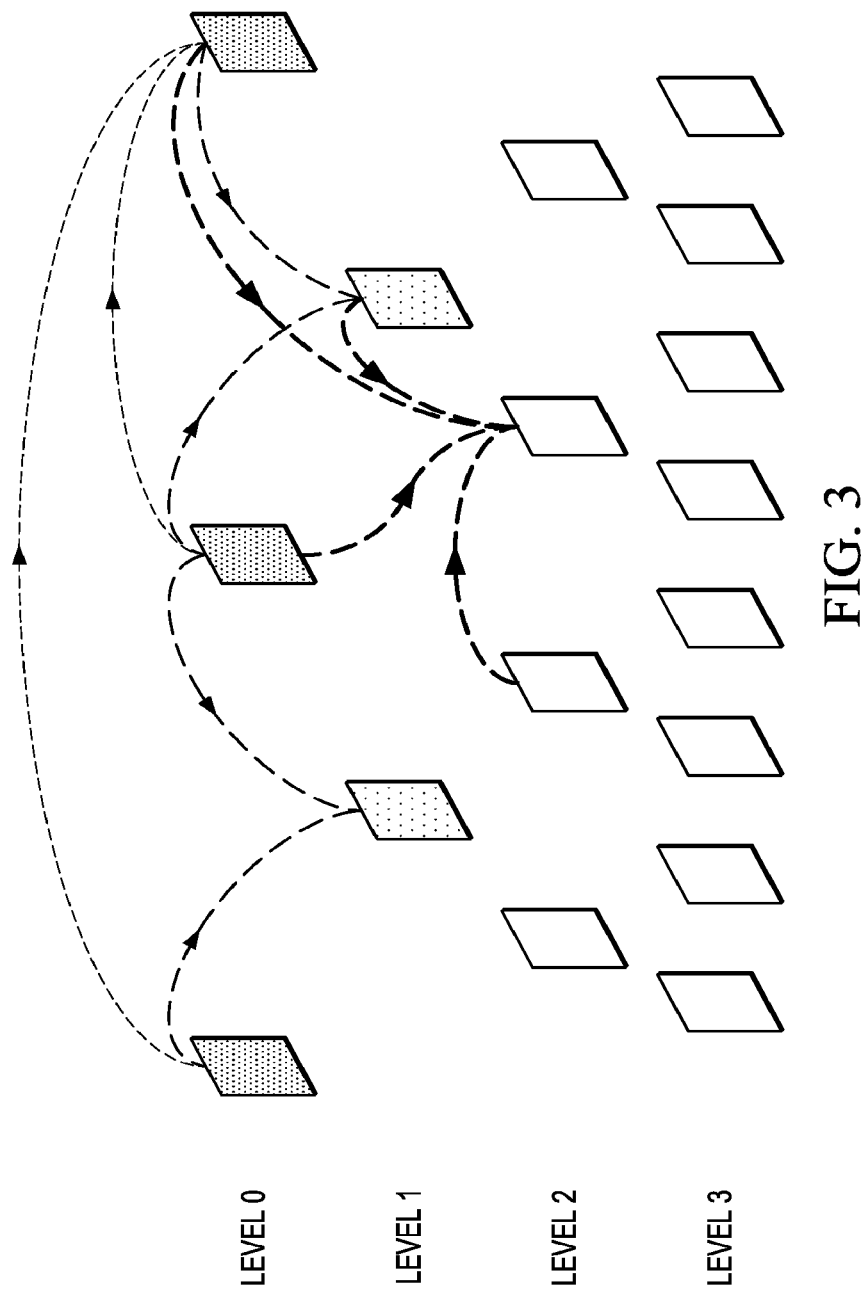
FIGS. 3-6 are examples.

Each of the encoders 202, 204, 206 supports temporal scalability as defined by HEVC. Thus, the input video sequences to each of the encoders may be encoded in multiple temporal levels and reference pictures from one or more temporal levels may be used for inter-layer prediction. In some embodiments, the scalable encoder 200 signals in the scalable bitstream an indication of the highest temporal level of reconstructed pictures from an encoder layer that are used for inter-layer prediction. This indication may be, for example, the actual level number or some other value representative of the level number. For example, consider the simple example of temporal scalable encoding in FIG. 3. In this example, there are four temporal levels and a group of pictures (GOP) of size 8 is assumed. The dashed lines illustrate the reference pictures used for prediction. For simplicity, reference pictures for only one picture in the temporal levels above level 1 are shown. If this temporal encoding is performed in the base layer encoder 202 and the pictures in level 0 and level 1 are used for inter-layer prediction by an enhancement layer encoder, an indication that the highest temporal level used for inter-layer prediction in the base layer bitstream (BL bitstream) is level 1 is signaled in the scalable bitstream. Similarly, if this temporal encoding is performed in the enhancement layer encoder 204 and the pictures in level 0 and level 1 are used for inter-layer prediction by the enhancement layer encoder 206, an indication that the highest temporal level used for inter-layer prediction in the intermediate enhancement layer bitstream (EL1 bitstream) is level 1 is signaled in the scalable bitstream.

In some embodiments, the scalable encoder 200 signals in the scalable bitstream an indication of the maximum decoded picture buffer (DPB) size needed for decoding an enhancement layer bitstream when that bitstream is the target bitstream for decoding. In some such embodiments, this indication may be signaled in addition to any indication of the highest temporal level used for inter-layer prediction. In some such embodiments, the signaling of indication of the highest temporal level used for inter-layer prediction is not supported. This indication may be, for example, an integer number of pictures or any other value that indicates a maximum number of pictures that need to be stored in the DPB. In some embodiments, the indication of the maximum DPB size may be a total maximum DPB size needed to decode the particular enhancement layer bitstream and any lower layer bitstreams needed for inter-layer prediction. In some embodiments, the indication of the maximum DPB size maybe be maximum DPB sizes corresponding to each layer bitstream (except the top enhancement layer bitstream) that indicate the maximum DPB size need to decode the layer bitstream when the layer bitstream is not the target bitstream, i.e., when the layer bitstream is used as a reference bitstream.

As is explained in more detail in reference to the description of the scalable decoder 220, such information may allow a scalable decoder with limited space for DPB storage to decode bitstreams that it might not otherwise be able to decode. A decoded picture buffer (DPB) is a buffer for holding decoded pictures for reference, output reordering, output delay, etc. HEVC specifies the maximum number of pictures to be stored in a DPB in a decoder based on level and profile. As currently defined, the maximum number of pictures in a DPB may be 16, 12, 8, or 6, depending on the expected picture size as specified by the level, where the maximum number of pictures decreases as the picture size increases. Current level definitions for HEVC may be found in Annex A of HEVC/H.265. To decode a target bitstream from the scalable bitstream, the corresponding compliant layer decoder needs to have the maximum DPB size available for the particular profile and level of scalable bitstream as all pictures in the target bitstream must be decoded.

Figure 4:
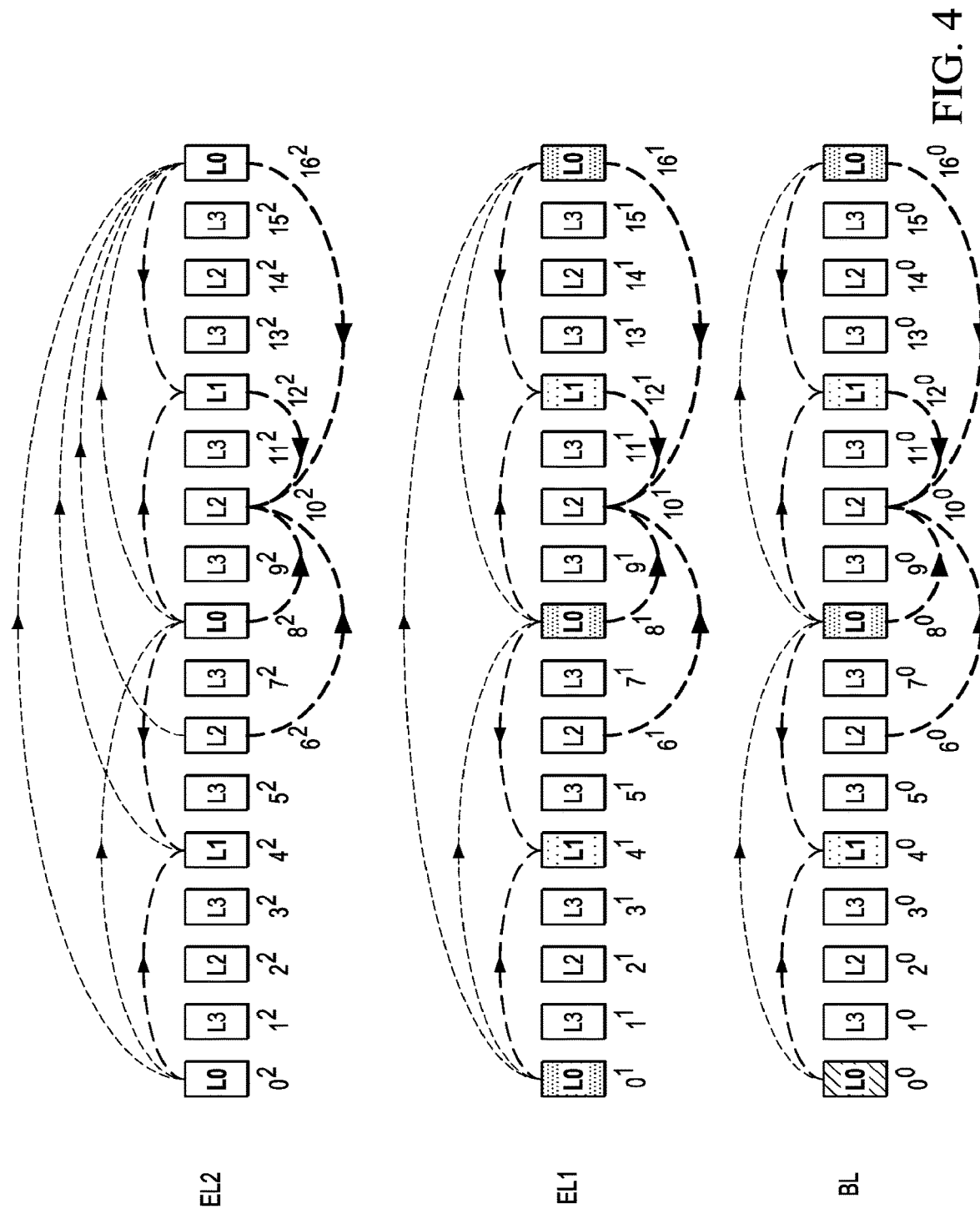

However, it may not be necessary to decode all pictures in layer bitstreams below the target layer bitstream, which may reduce the maximum DPB size needed to decode such bitstreams. For example, if a lower layer bitstream is encoded using temporal levels and any inter-layer prediction in the target layer bitstream uses reference data from a subset of the temporal levels in the lower layer bitstream, it is not necessary to decode all pictures in the lower layer bitstream in order to decode the target bitstream. Consider the example of FIG. 4. This example shows corresponding portions of a base layer bitstream (BL), an intermediate enhancement layer bitstream (EL1), and a top enhancement layer bitstream (EL2). Four temporal levels are assumed for each encoding layer and the labels Lx, x=0, 1, 2, 3 where x is the temporal level, indicate the temporal level of each picture. A GOP of size 8 is assumed. The dashed lines illustrate the reference pictures used for prediction. For simplicity, reference pictures for only two pictures in the temporal levels above level 1 are shown. In the BL and EL1 bitstreams, the shaded pictures are used for inter-layer prediction. Further, the picture size is assumed to be high definition such that HEVC requires a DPB sized for six pictures when all pictures must be decoded.

In this example, if the base layer bitstream is the target bitstream for decoding, a DPB sized for 6 pictures is required. If the target bitstream for decoding is the EL1 bitstream, a DPB sized for 6 pictures is required for decoding in the EL1 layer decoder. However, given the prediction hierarchy of the base layer bitstream and the pictures that are used for inter-layer prediction, a DPB sized for 2 pictures is needed for decoding this bitstream when it is not the target bitstream as any pictures not in temporal layers 0 and 1 need not be decoded and the maximum picture storage needed at any given time during decoding is 2 pictures. If the target bitstream for decoding is the EL2 bitstream, then a DPB sized for 6 pictures is required for decoding in the EL2 decoder. As previously explained, the maximum DPB picture storage needed for decoding the BL bitstream is 2 pictures. For the EL1 bitstream, given the prediction hierarchy of the bitstream and the pictures that are used for inter-layer prediction, a DPB sized for 3 pictures is needed for decoding this bitstream when it is not the target bitstream as any pictures not in temporal layers 0 and 1 need not be decoded and the maximum picture storage needed at any given time during decoding is 3 pictures. Thus, in some embodiments, the scalable encoder may signal in the scalable bitstream an indication that the maximum DPB size needed to decode the EL2 bitstream as the target bitstream along with any reference bitstreams is 11 and an indication that the maximum DPB size needed to decode the EL1 bitstream as the target bitstream along any reference bitstreams is 8. In some such embodiments, the scalable encoder 200 may signal the indications of maximum DPB sizes needed for decoding as indications that the maximum non-target DBP size for the BL bitstream is 2 pictures and the maximum non-target DBP size for the EL1 bitstream is 3 pictures. There is no maximum non-target DPB size to be signaled for the EL2 bitstream as this bitstream cannot be used for inter-layer prediction of any other bitstream.

The scalable encoder 200 may signal the highest temporal level indications and/or the maximum DBP size indications, for example, in a video parameter set (VPS) corresponding to the three sub-bitstreams. In HEVC, the VPS provides metadata to describe the overall characteristics of corresponding coded video sequences, including the dependencies between temporal levels. The VPS may be further extended in SHVC to include the signaling of overall characteristics of base layer and enhancement layer bitstreams in a scalable bitstream including information regarding highest temporal layers used for inter-layer prediction and/or maximum DBP sizes.

The scalable decoder 220 de-multiplexes 232 the scalable bitstream to separate out the base layer bitstream, the intermediate enhancement layer bitstream, and the top enhancement layer bitstream and directs these bitstreams to the appropriate layer encoder 222, 224, 226 as needed to decode a target bitstream to generate an output video sequence. Each layer of the scalable video decoder 220 is basically an HEVC video decoder extended to support decoding of bitstreams encoded using inter-layer prediction. The base layer decoder 222 decodes the lowest resolution bitstream, i.e., the base layer bitstream, as an HEVC compliant bitstream and the enhancement layer decoders 224, 226 decode the corresponding higher resolution bitstreams according to HEVC with the addition of any functionality needed for enhancement layer decoding, e.g., inter-layer prediction. The up-sampler 228 up-samples the reference data (reconstructed pictures) from the base layer decoder 222 to the resolution of the input bitstream of the enhancement layer decoder 224 for use in decoding when inter-layer prediction is indicated. Similarly, the up-sampler 230 up-samples the reference data (reconstructed pictures) from the intermediate enhancement layer decoder 224 to the resolution of the input bitstream of the top enhancement layer decoder 226 for use in decoding when inter-layer prediction is indicated. Although not explicitly shown for the sake of simplicity, the top enhancement layer decoder 226 may also use reference data from the base layer decoder 222 for decoding when inter-layer prediction is indicated and appropriate upsampling is provided.

Prior to de-multiplexing the bitstreams, the scalable decoder 220 may determine the target layer to be decoded for output, thus allowing the decoder 220 to ignore any bitstreams for layers above the target layer. For example, if the target bitstream to be decoded is the intermediate enhancement layer bitstream, the decoder 220 can ignore the top enhancement layer bitstream in the scalable bitstream. Further, in some embodiments, the scalable decoder 220 decodes metadata in the scalable bitstream that indicates maximum DPB sizes needed for decoding the enhancement layer bitstreams (and their reference bitstreams) if these bitstreams are selected as the target bitstream. In some such embodiments, this metadata indicates a maximum DPB size needed for decoding the intermediate layer bitstream and the base layer bitstream when these bitstreams are not the target bitstream. The metadata may be encoded, for example, in a VPS corresponding to the three bitstreams. The decoder 220 may use the indicated maximum DPB sizes to determine whether or not the decoder 220 has sufficient DPB capacity to decode the target bitstream. For example, as previously explained, HEVC specifies a maximum DPB size needed for decoding a bitstream of a given level. In order to decode the target bitstream, the decoder 220 should have storage capacity for this maximum DPB size. Further, the decoder 220 should have sufficient storage capacity to decode those pictures of the layer bitstreams below the target bitstream that might be used for inter-layer prediction in the target bitstreams.

The decoder 220 may use the indicated maximum DPB size to determine the maximum DPB size needed for decoding the target bit-stream (with all reference bitstreams). If the decoder 220 does not have the DPB storage capacity needed, the decoder 220 may, for example, not decode the target bitstream and indicate an error or select another target bitstream for which it has sufficient DPB storage capacity to decode. For example, consider the simple example of FIG. 4. Recalling the previously stated assumptions for this example, if the target bitstream is the EL1 bitstream, the maximum DPB capacity needed by the decoder 220 is 6 pictures for the EL1 bitstream and 2 pictures for the BL bitstream. If the target bitstream is the EL2 bitstream, the maximum DPB capacity needed by the decoder 220 is 6 pictures for the EL2 bitstream, 3 pictures for the EL1 bitstream, and 2 pictures for the BL bitstream. Note that in this example if the maximum DPB sizes are not signaled, the maximum DPB capacity needed by the decoder 220 for decoding the EL2 bitstream must be assumed to be 18 pictures and for decoding the EL1 bitstream must be assumed to be 12 pictures, even though fewer pictures are actually needed.

In some embodiments, the scalable decoder 220 decodes metadata in the scalable bitstream that indicates highest temporal levels in each of the base layer bitstream and the intermediate enhancement layer bitstream having pictures used as reference pictures for inter-layer prediction. This metadata may be encoded, for example, in a VPS corresponding to the three bitstreams. The indicated highest temporal levels are provided to the corresponding layer decoders 222, 224. The indicated highest temporal level may be used by a layer decoder when the bitstream being decoded is not the target bitstream to avoid decoding any pictures in higher temporal levels as these pictures will not be needed for decoding of pictures used for inter-layer prediction. Put another way, given the indicated highest temporal level, a level decoder, when decoding a bitstream that is not the target bitstream, only decodes pictures in the indicated temporal level and any temporal levels below the indicated level.

Figure 5:
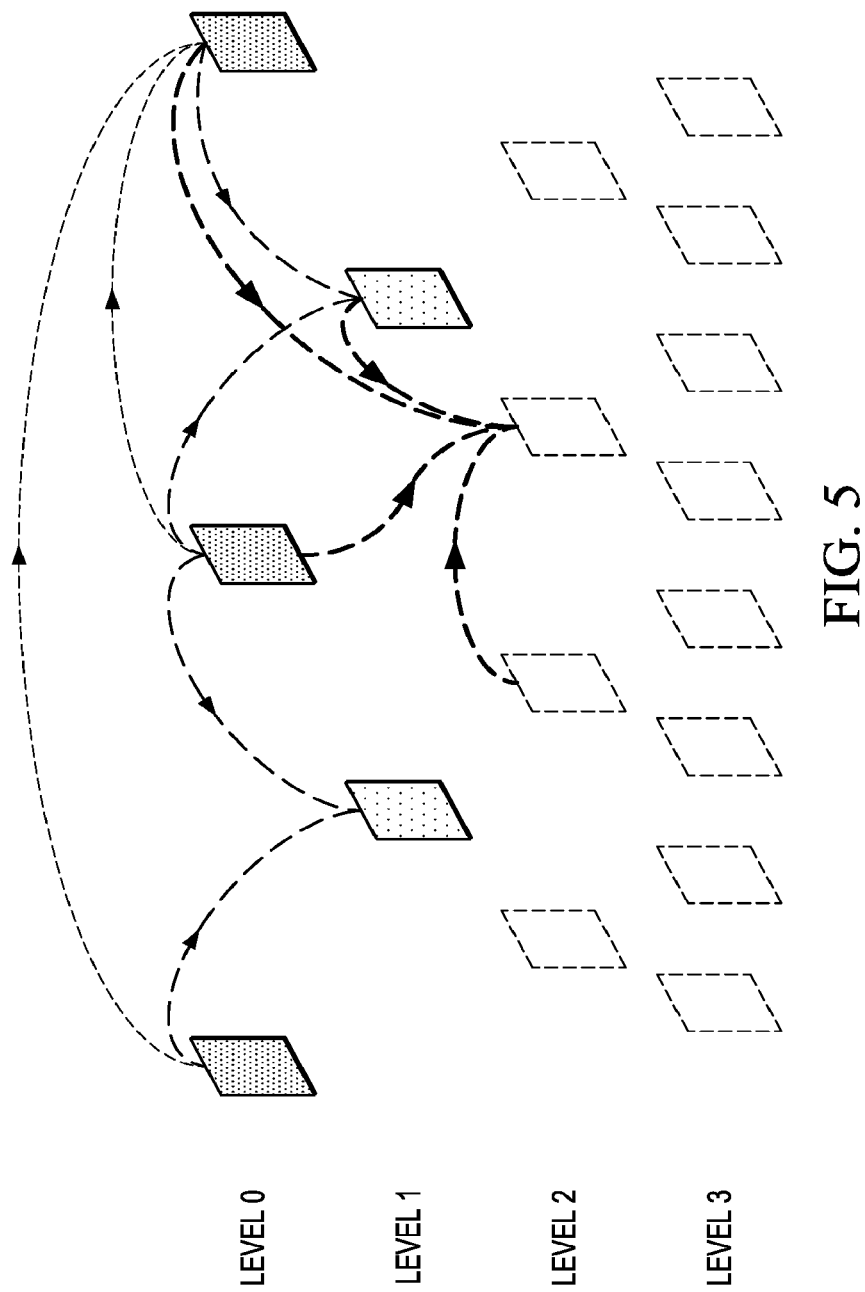
Figure 6:
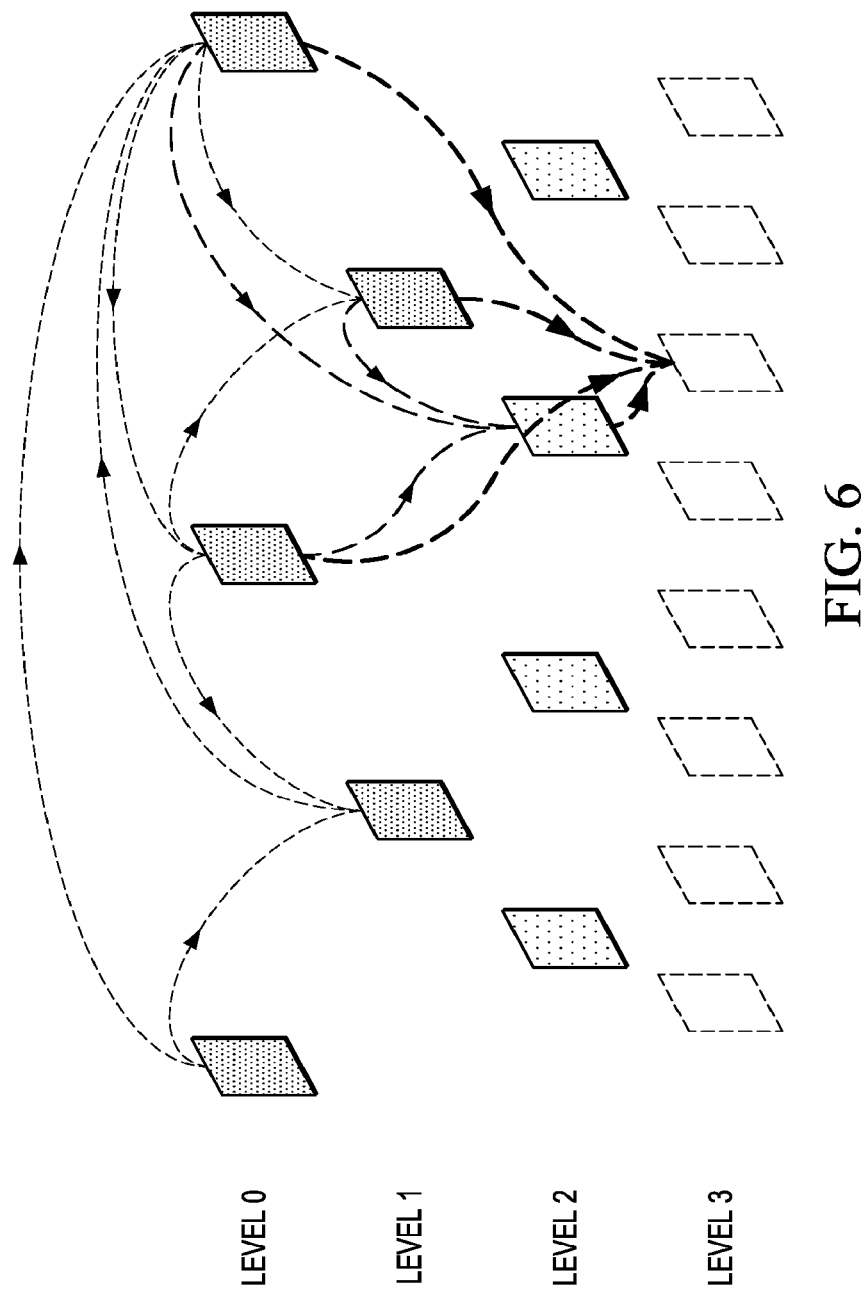

For example, consider the simple examples in FIGS. 5 and 6 of temporally encoded bitstreams for, respectively, a base layer bitstream and an intermediate enhancement layer bitstream. In these examples, there are four temporal levels and a group of pictures (GOP) of size 8 is assumed. The dashed lines illustrate the reference pictures used for prediction. The shaded pictures indicate pictures that are used for inter-layer prediction. For simplicity, reference pictures for only one picture in the temporal levels above level 1 are shown in FIG. 5 and reference pictures for only one picture in each of the temporal levels above level 1 are shown in FIG. 6. For the base layer bitstream of FIG. 5, an indication that the highest temporal level used for inter-layer prediction is level 1 is decoded from the scalable bitstream. Similarly, for the intermediate enhancement layer bitstream of FIG. 6, an indication that the highest temporal level used for inter-layer prediction is level 2 is decoded from the scalable bitstream. If the target bitstream to be decoded by the decoder 220 is the intermediate enhancement level bitstream, the base layer decoder 222 will only decode pictures in temporal layers 0 and 1, and the pictures in the other layers (designated by dashed lines in FIG. 5) will not be decoded, thus reducing the overall memory bandwidth needed. Similarly, if the target bitstream to be decoded by the decoder 220 is the top level enhancement bitstream, the base layer decoder 222 will only decode pictures in temporal layers 0 and 1 and the intermediate enhancement layer decoder 224 will only decode pictures in temporal layers 0, 1, and 2.

Figure 8:
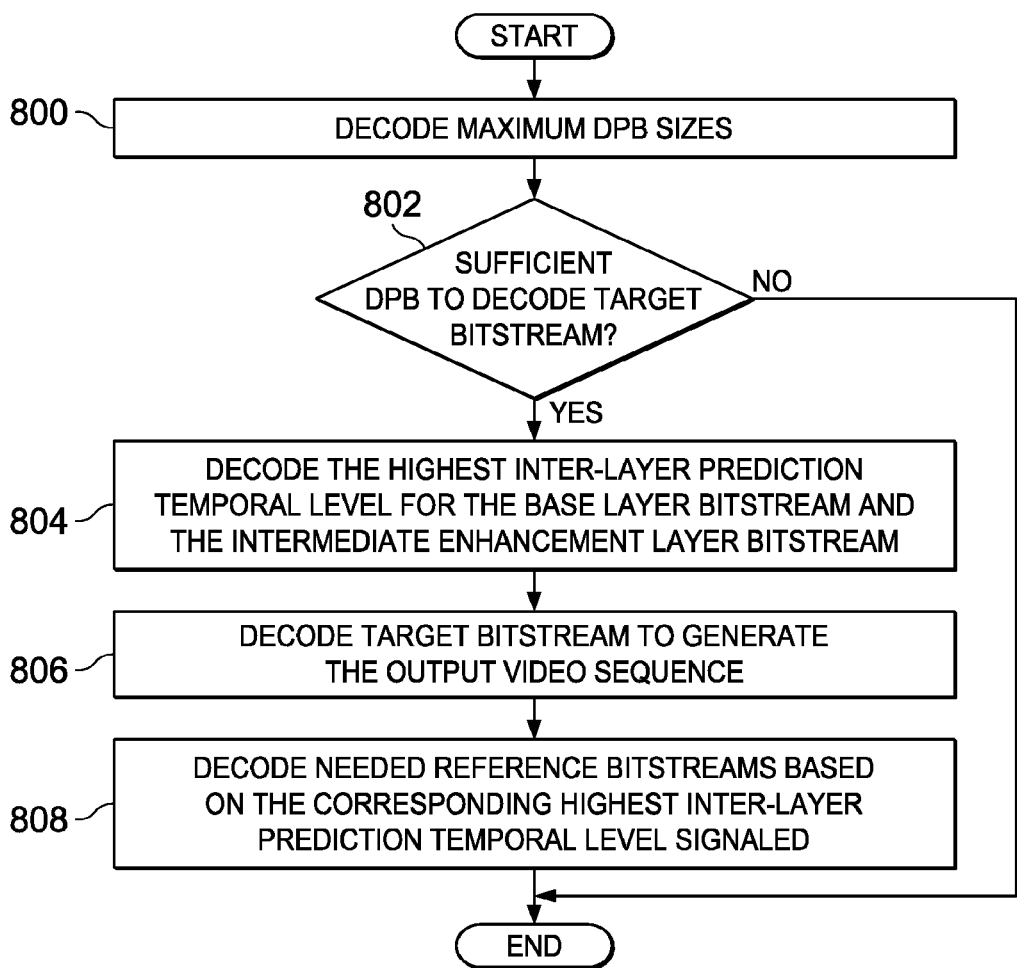

FIG. 8 is a flow diagram of a method for encoding of a video sequence in a scalable multi-loop video encoder to generate a scalable bitstream, e.g., the scalable video encoder of FIG. 2. For simplicity of description, the scalable video encoder is assumed to have a base layer encoder, an intermediate enhancement layer encoder, and a top enhancement layer encoder. One of ordinary skill in the art will understand embodiments in which a scalable video encoder may have more or fewer enhancement layers.

The video sequence is encoded 700 in each of the base layer encoder, the intermediate enhancement level encoder, and the top enhancement layer encoder. The output of each of these layer encoders is, respectively, a base layer bitstream, an intermediate enhancement layer bitstream, and a top enhancement layer bitstream. For encoding in the intermediate level encoder and the base layer encoder, the video sequence may be downsampled to different levels of spatial resolution, with the base layer encoding the video sequence at the lowest level of spatial resolution. The base layer encoder encodes the input video sequence as an HEVC compliant bitstream. The enhancement layer encoders encode the respective higher resolution input video sequences according to HEVC with the addition of any functionality needed for enhancement layer encoder, e.g., inter-layer prediction. Further, each layer encoder may encode the respective input video sequence using temporal scalability as defined by HEVC. Thus, any pictures used for inter-layer prediction by the enhancement layers may refer to pictures encoded at differing temporal levels in a reference layer bitstream.

The three sub-bitstreams are combined 702 to generate the scalable bitstream. Further, for each of the base layer bitstream and the intermediate enhancement level bitstream, an indication of the highest temporal level having pictures used for inter-layer prediction is signaled 704 as metadata in the scalable bitstream. In addition, for each enhancement layer bitstream, an indication of the maximum DPB size needed to decode the enhancement layer bitstream and any reference layer bitstreams when the enhancement layer bitstream is the target bitstream for decoding is signaled 706 as metadata in the scalable bitstream. In some embodiments, the indication of the maximum DPB size is in the form of indications of the maximum DPB sizes needed for decoding each of the base layer bitstream and the intermediate layer bitstream when these bitstreams are not the decoder target bitstream. Note that a scalable video encoder will know these highest temporal levels and the maximum DPB sizes based on the actual temporal prediction hierarchies used in encoding the bitstreams and the actual inter-layer prediction used in encoding the bitstreams. In some embodiments, the indications of maximum DPB sizes and highest inter-layer prediction temporal levels are signaled in a VPS corresponding to the three bitstreams.

Figure 7:
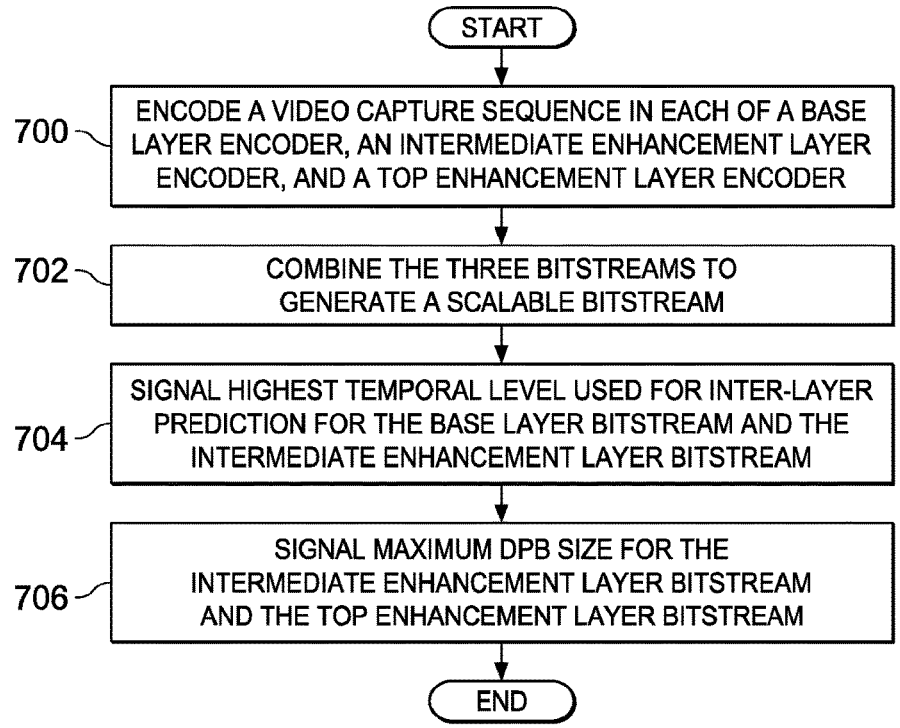
FIGS. 7 and 8 are flow diagrams of methods.

While the method of FIG. 7 has been described as signaling both highest temporal levels and maximum DPB sizes, one of ordinary skill in the art will understand embodiments in which highest temporal levels are signaled and maximum DPB sizes are not signaled and vice versa.

FIG. 8 is a flow diagram of a method for decoding a target bitstream of a scalable bitstream in a scalable multi-loop video decoder to generate an output video sequence, e.g., the scalable video decoder of FIG. 2. For simplicity of description, the scalable bitstream is assumed to include a base layer bitstream, an intermediate enhancement layer bitstream, and a top enhancement layer bitstream and the scalable video decoder is assumed to have a base layer decoder, an intermediate enhancement layer decoder, and a top enhancement layer decoder. One of ordinary skill in the art will understand embodiments in which a scalable video decoder may have more or fewer enhancement layers and/or the scalable bitstream may have more or fewer enhancement bitstreams.

Initially, indications of maximum DPB sizes for decoding the two enhancement layer bitstreams as target bitstreams together with any reference layers are decoded 800 from the scalable bitstream. In some embodiments, these indications are signaled as indications of maximum non-target DPB sizes for the base layer bitstream and the intermediate enhancement layer bitstream. In some embodiments, the maximum DPB sizes are signaled in a VPS corresponding to the three bitstreams. These sizes are then used by the scalable decoder to determine 802 whether or not the decoder has sufficient DPB space to decode the desired target bitstream of the scalable bitstream. For example, consider the previously described example of FIG. 4. In this example, the maximum non-target DPB size for the base layer (BL) bitstream is 2 and the maximum non-target DPB size for the intermediate enhancement layer (EL1) bitstream is 3. If the target bitstream for decoding is the EL1 bitstream, DPB memory for 8 pictures is required to decode it, 6 for decoding the EL1 bitstream, and 2 for decoding the BL bitstream. If the target bitstream for decoding is the EL2 bitstream, DPB memory for 11 pictures is required to decode it, 6 for decoding the EL2 bitstream, 3 for decoding the EL1 bitstream, and 2 for decoding the BL bitstream.

If the scalable decoder does not have sufficient DPB memory to decode the desired target bitstream, the method ends and the decoder may take appropriate action in response to the insufficient DBP memory. For example, the decoder may select another target bitstream to decode for which it has sufficient DPB memory or the decoder may signal an error. If the scalable decoder has sufficient DPB memory to decode the desired target bitstream, then, for each of the base layer bitstream and the intermediate layer bitstream, an indication of the highest temporal level in the bitstream that includes pictures used as reference pictures for inter-layer prediction is decoded 804 from the scalable bitstream. In some embodiments, the highest inter-layer prediction temporal levels are signaled in a VPS corresponding to the three bitstreams.

The target bitstream is then decoded 806 to generate the output video sequence and any needed reference bitstreams for decoding the target bitstream are also decoded 808 from the scalable bitstream based on the corresponding highest inter-layer prediction temporal levels signaled. More specifically, if the target bitstream is the intermediate enhancement level bitstream, the intermediate enhancement layer bitstream is decoded by the intermediate enhancement layer decoder. And, if some of the video data in the intermediate enhancement layer bitstream is inter-layer predicted using reference data from pictures in the base layer bitstream, the pictures of the base layer bitstream that are in the signaled highest temporal level for the base level bitstream and pictures in any lower temporal level are decoded in the base layer decoder to be available as needed for inter-layer prediction signaled in the intermediate enhancement layer bitstream. Any pictures in the base level bitstream in temporal levels above the signaled highest temporal level are not decoded.

Further, if the target bitstream is the top enhancement level bitstream, the top enhancement layer bitstream is decoded by the top enhancement layer decoder. If some of the video data in the top enhancement layer bitstream is inter-layer predicted using reference data from pictures in the intermediate enhancement layer bitstream, the pictures of the intermediate enhancement layer bitstream that are in the signaled highest temporal level for this bitstream and pictures in any lower temporal level are decoded in the intermediate layer decoder to be available as needed for inter-layer prediction signaled in the top enhancement layer bitstream. Any pictures in the intermediate enhancement level bitstream in temporal levels above the signaled highest temporal level are not decoded. And, if some of the video data in the top enhancement layer bitstream and/or the intermediate enhancement layer bitstream is inter-layer predicted using reference data from pictures in the base layer bitstream, the pictures of the base layer bitstream that are in the signaled highest temporal level for this bitstream and pictures in any lower temporal level are decoded in the base layer decoder to be available as needed for inter-layer prediction signaled in the top enhancement layer bitstream and the intermediate enhancement layer bitstream. Any pictures in the base level bitstream in temporal levels above the signaled highest temporal level are not decoded.

While the method of FIG. 8 has been described assuming signaling of both highest temporal levels and maximum DPB sizes in the scalable bitstream, one of ordinary skill in the art will understand embodiments in which highest temporal levels are signaled and maximum DPB sizes are not signaled and vice versa.

FIG. 9 is a block diagram of an example digital system suitable for use as an embedded system that may be configured to encode a video sequence into a scalable bitstream and/or to decode a scalable bitstream as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 900 is a programmable platform designed to meet the processing needs of applications such as video encode/decode/transcode/transrate, video surveillance, video conferencing, set-top box, medical imaging, media server, gaming, digital signage, etc. The SoC 900 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 900 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+™ core with a very-long-instruction-word (VLIW) architecture. In general, the ARM is responsible for configuration and control of the SoC 900, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 900 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 9, the SoC 900 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 900 may be configured to encode a video sequence into a scalable bitstream and/or to decode a scalable bitstream as described herein as described herein. For example, high level coding control for scalable encoding and/or decoding may be executed on the DSP subsystem or the ARM subsystem and at least some of the computational operations of encoding a video sequence as a scalable bitstream and/or decoding a scalable bitstream may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

The invention claimed is:

1. A method comprising:
   decoding, by a decoder, an indication of a decoded picture buffer (DPB) size from a bitstream;
   decoding, by the decoder, a first enhancement layer of the bitstream and a reference layer of the bitstream based on the indication of the DPB size to generate decoded data; and
   outputting, by the decoder, the decoded data.

2. The method of claim 1, wherein the indication of the DPB size indicates whether the decoder has sufficient DPB memory to decode the first enhancement layer.

3. The method of claim 1, wherein the indication of the DPB size indicates a decoding size needed for decoding the reference layer as a non-target layer.

4. The method of claim 1, wherein the reference layer is a base layer.

5. The method of claim 1, wherein the reference layer is a second enhancement layer.

6. The method of claim 1,
   wherein the bitstream includes a first temporal level for the first enhancement layer and a second temporal level for the reference layer, and
   wherein decoding the first enhancement layer and the reference layer includes decoding the first temporal level and the second temporal level.

7. The method of claim 1,
   wherein the indication is a first indication, and
   wherein the method further comprises decoding a second indication of a highest temporal level.

8. The method of claim 7, further comprising decoding only pictures in the highest temporal level and in any temporal levels below the highest temporal level.

9. The method of claim 7, further comprising refraining from decoding pictures in any temporal levels above the highest temporal level.

10. The method of claim 7, further comprising refraining from decoding any pictures in an intermediate enhancement level bitstream in temporal levels above the highest temporal level.

11. An apparatus comprising:
- means for decoding from a bitstream an indication of a decoded picture buffer (DPB) size;
- means for decoding a first enhancement layer of the bitstream and a reference layer of the bitstream based on the indication of the DPB size to generate decoded data; and
- means for outputting the decoded data.

12. The apparatus of claim 11, wherein the indication of the DPB size indicates whether a video decoder has sufficient DPB memory to decode the first enhancement layer.

13. The apparatus of claim 11, wherein the indication of a DPB size indicates a decoding size needed for decoding the reference layer as a non-target layer.

14. The apparatus of claim 11, wherein the reference layer is a base layer.

15. The apparatus of claim 11, wherein the reference layer is a second enhancement layer.

16. The apparatus of claim 11,
- wherein the bitstream includes a first temporal level for the first enhancement layer and a second temporal level for the reference layer, and
- wherein the means for decoding the first enhancement layer and the reference layer comprises means for decoding the first temporal level and the second temporal level.

17. The apparatus of claim 11,
- wherein the indication is a first indication, and
- wherein the apparatus further comprises means for decoding a second indication of a highest temporal level.

18. The apparatus of claim 17, further comprising means for decoding only pictures in the highest temporal level and in any temporal levels below the highest temporal level.

19. The apparatus of claim 17, further comprising means for refraining from decoding pictures in any temporal levels above the highest temporal level.

20. The apparatus of claim 17, further comprising means for refraining from decoding any pictures in an intermediate enhancement level bitstream in temporal levels above the highest temporal level.

* * * * *